(12) United States Patent
Dueease et al.

(10) Patent No.: US 12,735,205 B2
(45) Date of Patent: Sep. 15, 2026

(54) OPERATING MODES AND VIDEO PROCESSING FOR MOBILE PLATFORMS

(71) Applicant: Teledyne FLIR Defense, Inc., Thousand Oaks, CA (US)

(72) Inventors: William E. Dueease, Gainesville, FL (US); Isaac M. Reed, Gainesville, FL (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 246 days.

(21) Appl. No.: 17/864,034

(22) Filed: Jul. 13, 2022

(65) Prior Publication Data

US 2023/0030222 A1 Feb. 2, 2023

Related U.S. Application Data

(60) Provisional application No. 63/227,233, filed on Jul. 29, 2021.

(51) Int. Cl.

*B64U 20/87* (2023.01)
*B64U 10/13* (2023.01)
(Continued)

(52) U.S. Cl.

CPC ........... *B64U 20/87* (2023.01); *G05D 1/0094* (2013.01); *G05D 1/101* (2013.01); *B64U 10/13* (2023.01); *B64U 50/00* (2023.01); *B64U 2101/30* (2023.01)

(58) Field of Classification Search

CPC .... G05D 1/101; G05D 1/0094; G05D 1/0038; B64C 39/024; B64D 47/08; B64U 10/13;
(Continued)

(56) References Cited

U.S. PATENT DOCUMENTS 9,563,201 B1 * 2/2017 Tofte ...................... H04N 23/90
10,046,856 B2 8/2018 Lee
(Continued)

OTHER PUBLICATIONS

H. Guggi and B. Rinner, "Increasing Efficiency of Data-flow Based Middleware Systems by Adapting Data Generation," 2013 IEEE 7th International Conference on Self-Adaptive and Self-Organizing Systems, Philadelphia, PA, USA, 2013, pp. 189-198, doi: 10.1109/SASO.2013.47. (Year: 2013).*
(Continued)

*Primary Examiner* — Kenneth J Malkowski
*Assistant Examiner* — Ibrahim Abdoalatif Alsomairy
(74) *Attorney, Agent, or Firm* — Haynes and Boone, LLP

(57) ABSTRACT

Systems and methods related to operating modes and video processing for mobile platforms are disclosed. In one example, a logic device of a mobile platform may receive, from a base station, a command comprising a selection of one of a plurality of operating modes for the mobile platform, where each operating mode is associated with a plurality of corresponding control operations. The logic device may execute the control operations associated with the selected operating mode in response to the command. A video processing device having a low latency pipeline may be implemented in the mobile platform to assist the mobile platform in conducting the operating modes such as by outputting real time video streaming and telemetry information for the mobile platform. Related devices and systems are also provided.

20 Claims, 9 Drawing Sheets

(51) Int. Cl.
*B64U 50/00* (2023.01)
*B64U 101/30* (2023.01)
*G05D 1/00* (2024.01)

(58) Field of Classification Search
CPC .... B64U 50/00; B64U 2101/30; B64U 20/87; B64U 2201/102
See application file for complete search history.

(56) References Cited

U.S. PATENT DOCUMENTS

| | | | | |
|---|---|---|---|---|
| 10,657,827 | B2 | 5/2020 | Eyhorn | |
| 2016/0116914 | A1* | 4/2016 | Mucci | G05D 1/0011 701/2 |
| 2017/0010121 | A1* | 1/2017 | Shashua | G08G 1/096725 |
| 2018/0002010 | A1* | 1/2018 | Bauer | G05D 1/689 |
| 2018/0004231 | A1* | 1/2018 | Michini | G05D 1/0094 |
| 2018/0356816 | A1 | 12/2018 | McLean et al. | |
| 2019/0130641 | A1* | 5/2019 | Barajas Hernandez | G06V 20/13 |
| 2019/0196512 | A1 | 6/2019 | Blake et al. | |
| 2020/0010194 | A1* | 1/2020 | Liu | B64C 19/00 |
| 2020/0062394 | A1* | 2/2020 | Bin | G05D 1/0016 |
| 2020/0082168 | A1* | 3/2020 | Fathi | G06T 7/521 |
| 2022/0046321 | A1* | 2/2022 | Enke | H04N 23/661 |
| 2022/0390965 | A1* | 12/2022 | Lund | H04N 23/695 |

OTHER PUBLICATIONS

GStreamer (2 pages), 2012. [URL: https://gstreamer.freedesktop.org/documentation/applicationdevelopment/introduction/gstreamer.html?gi-language=c].

Skydio-X2 Color/Thermal Datasheet (2 pages), 2020. [URL: https://pages.skydio.com/rs/784-TUF-591/images/skydio-x2e-datasheet.pdf ?_ga=2.170897376.150282996.1665778654-238577299.1665778654&_gac=1.237625780.1665780217.EAlalQobChMI-svl78rg-gIVRAV9Ch0IUA5JEAAYASAAEgljw_D_BwE].

Teal One Drone Informational Sheet (2 pages), 2018. [URL: https://tealdrones.com/teal-one/].

DJI Informational Sheet (2 pages), 2019. [URL: https://www.dji.com/manifold-2/specs].

Jetson Informational Sheet (3 pages), 2014. [URL: https://www.nvidia.com/en-us/autonomous-machines/embedded-systems/].

* cited by examiner

OPERATING MODES AND VIDEO PROCESSING FOR MOBILE PLATFORMS

CROSS REFERENCE TO RELATED APPLICATIONS

This application claims priority to and the benefit of U.S. Provisional Patent Application No. 63/227,233 filed Jul. 29, 2021 and entitled "OPERATING MODES AND VIDEO PROCESSING FOR MOBILE PLATFORMS," which is incorporated herein by reference in its entirety.

TECHNICAL FIELD

The present invention relates generally to mobile platforms and, more particularly, to operating mode and image processing systems and methods for mobile platforms.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and many others. Generally, a UAV may be equipped with a variety of different elements, such as different types of sensors and navigation devices, and may be configured to address a broad variety of operational needs. Operating such UAVs often requires an operator to input and have knowledge of complex controls. Further, the operator may have to rely on a video stream from the UAV that generally has latency, which can hinder the operator's ability to optimally control the UAV. The present disclosure provides user-friendly operating modes that minimize operator cognitive load and maximize usability of UAVs, and video processing techniques that reduce latency in video processing, such as for the operating modes.

SUMMARY

In one or more embodiments, a mobile platform includes a propulsion system configured to provide motive force for the mobile platform in navigation about an environment. The mobile platform may further include an imaging system configured to capture images of a field of view of the environment. The mobile platform may further include a logic device in communication with the propulsion system and the imaging system. The logic device may be configured to receive, from a base station, a command that includes a selection of one of a plurality of operating modes for the mobile platform, where each of the operating modes is associated with a plurality of corresponding control operations. The logic device may execute the control operations associated with the selected operating mode in response to the command.

In one or more embodiments, the mobile platform may further include a video processing device that has a pipeline configured to receive image data from the imaging system and process the image data at a first processing rate using a hardware-accelerated application and one or more hardware-accelerated plugins. In some embodiments, the video processing device may have an additional logic device in communication with the pipeline. The additional logic device may be configured to receive the image data from the pipeline and process the image data at a second processing rate to determine telemetry information for the mobile platform. The second processing rate may be slower than the first processing rate in some embodiments. The additional logic device may provide the telemetry information to the pipeline for output with the processed image data. In further embodiments, the logic device may retrieve the processed image data and/or telemetry information from the video processing device and execute at least one of the plurality of control operations for the operating mode using the processed image data and/or telemetry information.

In one or more embodiments, a method includes receiving, by a logic device of a mobile platform, from a base station, a command comprising a selection of one of a plurality of operating modes for the mobile platform. Each operating mode may be associated with a plurality of corresponding control operations. The method may further include executing, by the logic device, the control operations associated with the selected operating mode in response to the command.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
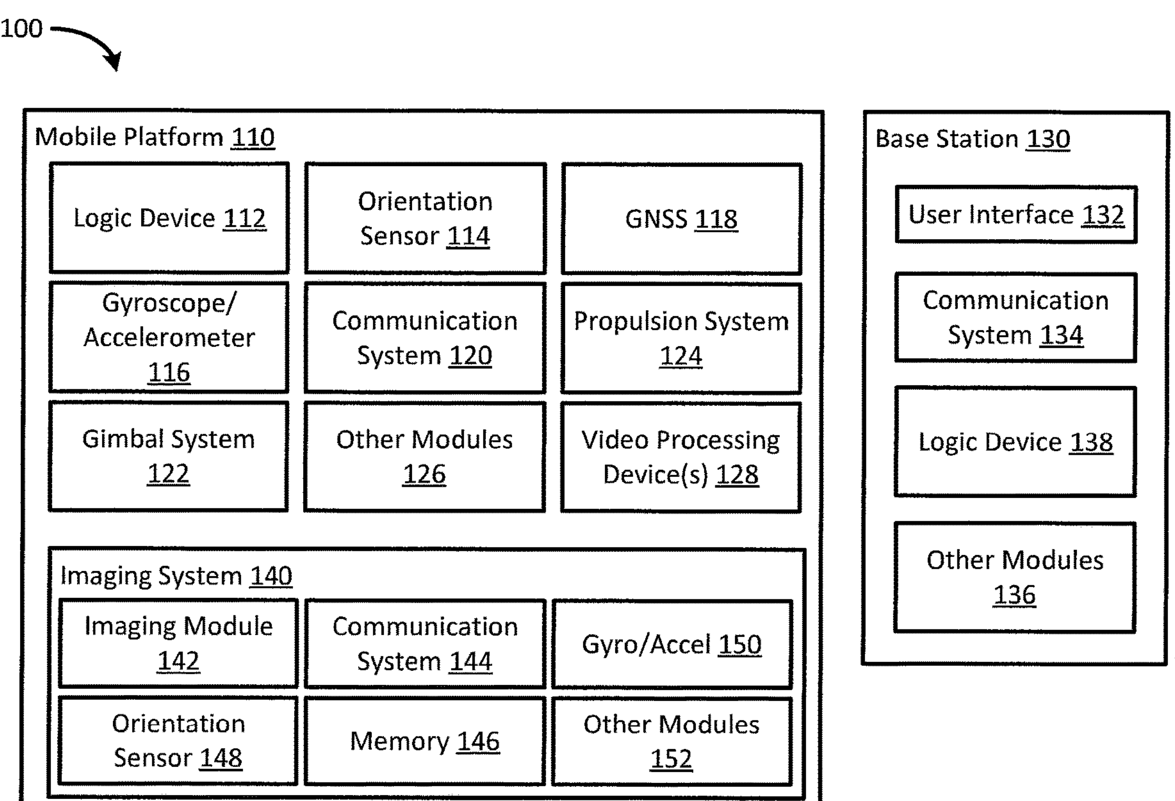
FIG. 1 illustrates a block diagram of a survey system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods related to operating modes for a mobile platform are provided. One example operating mode may be a Manual mode by which an operator may control altitude movements with rate commands and bump commands.

Another example operating mode may be a Look Here—Manual mode by which the mobile platform may automatically adjust a heading and/or payload to keep a field of view centered at a location (e.g., latitude, longitude, altitude) independent of lateral and altitude movements.

Another example operating mode may be a Look Here—Navigation mode, which may be similar to the Look Here—Manual mode except lateral and altitude movements may be controlled by a pre-planned mission.

Another example operating mode may be a Look Here—Tracking mode in which the mobile platform may use a vision processing algorithm to detect and lock onto a target. The mobile platform may automatically adjust a heading and payload to keep the target centered in a field of view. In some embodiments, the mobile platform may automatically adjust its lateral and altitude position to keep the target at a static relative position from where the Look Here—Tracking mode was initialized, which may allow the mobile platform to follow the target as it moves and keep the target in view.

Another example operating mode may be a Fly Here mode. In the Fly Here mode, lateral movement of a mobile platform may be automatically controlled to maintain a configurable offset distance away from a geopoint (e.g., longitude, latitude, altitude). In some embodiments, the offset distance may be a ratio of the height above ground of the mobile platform when the Fly Here mode is initialized or a configurable distance set by an operator of the mobile platform.

Another example operating mode may be a Security mode. The Security mode may allow an operator to mark waypoints while in flight and return to the marked waypoints later in a sequential order. The waypoints may include a location and a field of view for the mobile platform. The operator can enter the Security mode and the mobile platform may navigate to a location associated with each marked waypoint and adjust its heading and/or payload to capture a point of interest associated with the marked waypoint. Each waypoint may have an associated dwell period so that the mobile platform can automatically increment between the waypoints on a security route to monitor each of the points of interest on the security route with an effective field of view.

Another example operating mode may be a Divebomber mode. In the Divebomber mode, a geopoint in a centered field of view may be marked and the mobile platform may control the heading and/or payload to keep the geopoint centered in the field of view as the mobile platform descends to a configurable distance above the ground. During the descent, primary communication loss can be expected, thus communication fail-safes (e.g., fail-safe operations conventionally performed in response to communication loss) are purposefully disabled and video recording is enabled. When the mobile platform reaches a target altitude above the ground, it may dwell there for a configurable period. After the dwell period, the mobile platform may ascend to the altitude from where it began the descent, restore the communication fail-safes, and stop video recording. By using the Divebomber mode, a video recording of the previously unreachable location (e.g., due to expected communication loss) may now be viewable.

Various systems and methods related to reducing latency for video processing for a mobile platform are also provided. In some embodiments, a low-latency video pipeline of a video processing device on the mobile platform may be utilized to conduct one or more operating modes of the mobile platform. For example, the pipeline may reduce latency in video processing by using a hardware-accelerated application and plugins suitable for camera selection, zoom, image stabilization, handling of user commands, and so forth. The pipeline may include using a high-speed internal message bus for communicating with cameras of the mobile platform and plugins. One or more unaccelerated computer vision plugins may be isolated from the main pipeline so that their higher latency does not propagate to a main video stream. Processed image data outputted by the main pipeline and telemetry information calculated using the unaccelerated computer vision plugins may be used in conducting one or more operating modes of the mobile platform. Further details and additional embodiments are disclosed below in reference to the accompanying figures.

FIG. 1 illustrates a block diagram of a survey system 100 including a mobile platform 110 in accordance with one or more embodiments of the present disclosure. In various embodiments, the survey system 100 and/or elements of the survey system 100 may be configured to fly over a scene or survey area, to fly through a structure, or to approach a target and image or sense the scene, structure, or target, or portions thereof, using a gimbal system 122 to aim an imaging system/sensor payload 140 at the scene, structure, or target, or portions thereof, for example. Resulting imagery and/or other sensor data may be processed (e.g., by the sensor payload 140, mobile platform 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the survey system 100 may be configured to use such imagery and/or sensor data to control operation of the mobile platform 110 and/or the sensor payload 140, as described herein, such as controlling the gimbal system 122 to aim the sensor payload 140 towards a particular direction, and/or controlling a propulsion system 124 to move the mobile platform 110 to a desired position in a scene or structure or relative to a target. In some cases, the imagery and/or sensor data may be used to detect light emitting devices associated with a target location and, in turn, land the mobile platform 110 at the target location or align the mobile platform 110 to interact with the target location.

In the embodiment shown in FIG. 1, the survey system 100 includes the mobile platform 110, base station 130, and at least one imaging system/sensor payload 140. The mobile platform 110 may be implemented as a mobile platform configured to move or fly and position and/or aim the sensor payload 140 (e.g., relative to a designated or detected target). As shown in FIG. 1, the mobile platform 110 may include one or more of a logic device 112, an orientation sensor 114, a gyroscope/accelerometer 116, a global navigation satellite system (GNSS) 118, a communication system 120, a gimbal system 122, a propulsion system 124, and other modules 126. Operation of the mobile platform 110 may be substantially autonomous and/or partially or completely controlled by the base station 130, which may include one or more of a user interface 132, a communication system 134, a logic device 138, and other modules 136. In other embodiments, the mobile platform 110 may include one or more of the elements of the base station 130, such as with various types of manned aircraft, terrestrial vehicles, and/or surface or subsurface watercraft. The sensor payload 140 may be physically coupled to the mobile platform 110 and may be configured to capture sensor data (e.g., visible spectrum images, infrared images, narrow aperture radar data, and/or other sensor data) of a target position, area, and/or object(s) as selected and/or framed by operation of the mobile platform 110 and/or the base station 130. In some embodiments, one or more of the elements of the survey system 100 may be implemented in a combined housing or structure that can be coupled to or within the mobile platform 110 and/or held or carried by a user of the survey system 100.

The logic device 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the mobile platform 110 and/or other elements of the survey system 100, such as the gimbal system 122 and/or imaging system 140, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the survey system 100).

In addition, a non-transitory medium may be provided for storing machine readable instructions for loading into and execution by the logic device 112. In these and other embodiments, the logic device 112 may be implemented with other components where appropriate, such as volatile memory, non-volatile memory, one or more interfaces, and/or various analog and/or digital components for interfacing with devices of the survey system 100. For example, the logic device 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the logic device 112 may be integrated with one or more other elements of the mobile platform 110, for example, or distributed as multiple logic devices within the mobile platform 110, base station 130, and/or sensor payload 140.

In some embodiments, the logic device 112 may be configured to substantially continuously monitor and/or store the status of and/or sensor data provided by one or more elements of the mobile platform 110, sensor payload 140, and/or base station 130, such as the position and/or orientation of the mobile platform 110, sensor payload 140, and/or base station 130, for example. In various embodiments, sensor data may be monitored and/or stored by the logic device 112 and/or processed or transmitted between elements of the survey system 100 substantially continuously throughout operation of the survey system 100, where such data includes various types of sensor data (e.g., for blinking pattern detection), control parameters, and/or other data.

The orientation sensor 114 may be implemented as one or more of a compass, float, accelerometer, and/or other device capable of measuring an orientation of the mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of the survey system 100. In some cases, a yaw and/or position of the mobile platform 110 may be adjusted to better position/orient the mobile platform 110 to align with a target location based on detected blinking patterns of light emitting devices associated with the target location. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the mobile platform 110 and/or other elements of the survey system 100 and providing such measurements as sensor signals and/or data that may be communicated to other devices of the survey system 100 (e.g., user interface 132, logic device 112, logic device 138). The GNSS 118 may be implemented according to any global navigation satellite system, including a GPS, GLONASS, and/or Galileo based receiver and/or other device capable of determining absolute and/or relative position of the mobile platform 110 (e.g., or an element of the mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the survey system 100. In some embodiments, the GNSS 118 may include an altimeter, for example, or may be used to provide an absolute altitude.

The communication system 120 may be implemented as any wired and/or wireless communications module configured to transmit and receive analog and/or digital signals between elements of the survey system 100. For example, the communication system 120 may be configured to receive flight control signals, commands, and/or data from the base station 130 and provide them to the logic device 112, the gimbal system 122, the imaging system 140, and/or the propulsion system 124. In other embodiments, the communication system 120 may be configured to receive images and/or other sensor information (e.g., visible spectrum and/or infrared still images or video images) from the sensor payload 140 and relay the sensor data to the logic device 112 and/or base station 130. In some embodiments, the communication system 120 may be configured to support spread spectrum transmissions, for example, and/or multiple simultaneous communications channels between elements of the survey system 100. Wireless communication links may include one or more analog and/or digital radio communication links, such as WiFi and others, as described herein, and may be direct communication links established between elements of the survey system 100, for example, or may be relayed through one or more wireless relay stations configured to receive and retransmit wireless communications. Communication links established by the communication system 120 may be configured to transmit data between elements of the survey system 100 substantially continuously throughout operation of the survey system 100, where such data includes various types of sensor data, control parameters, and/or other data.

The gimbal system 122 may be implemented as an actuated gimbal mount, for example, that may be controlled by the logic device 112 to stabilize the sensor payload 140 relative to a target (e.g., a target location) or to aim the sensor payload 140 or components coupled thereto according to a desired direction and/or relative orientation or position. As such, the gimbal system 122 may be configured to provide a relative orientation of the sensor payload 140 (e.g., relative to an orientation of the mobile platform 110) to the logic device 112 and/or communication system 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of articulated the sensor/sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140±90 degrees, or up to 360 degrees, in a vertical plane relative to an orientation and/or position of the mobile platform 110. In further embodiments, the gimbal system 122 may rotate the sensor payload 140 to be parallel to a longitudinal axis or a lateral axis of the mobile platform 110 as the mobile platform 110 yaws, which may provide 360 degree ranging and/or imaging in a horizontal plane relative to mobile platform 110. In various embodiments, logic device 112 may be configured to monitor an orientation of gimbal system 122 and/or sensor payload 140 relative to mobile platform 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the mobile platform 110 and/or to steer the mobile platform 110. In some embodiments, the propulsion system 124 may include multiple propellers (e.g., a tri, quad, hex, oct, or other type "copter") that can be controlled (e.g., by the logic device 112 and/or the logic device 138) to provide lift and motion for the mobile platform 110 and to provide an orientation for mobile platform 110. In other embodiments, the propulsion system 124 may be configured primarily to provide thrust while other structures of the mobile platform 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

The video processing device(s) 128 may be implemented as one or more video processing computer. For example, the video processing device(s) 128 may include a System on Module (SOM), which may include CPU, GPU, memory, storage, power management, high-speed interfaces, and/or other image signal/sensor processing components that may be configured as part of or in communication with a low-latency video pipeline. In some embodiments, the video processing device(s) 128 may be implemented with a main hardware-accelerated application and hardware accelerated plugins, a command and control bus, and unaccelerated computer vision plugins. In some embodiments, the main hardware-accelerated application and hardware-accelerated plugins may be responsible for camera selection (e.g., electro-optical, infrared, etc.), zoom, image stabilization, handling of user commands, and so forth. The command and control bus may be a high-speed internal message bus for communicating with the cameras and plugins. The unaccelerated computer vision plugins may be isolated from a main pipeline of the video processing device 128 so that their higher latency does not propagate to a main video stream output of the pipeline. In some embodiments, video processing device 128 may be implemented using a Radeon R7 M440 graphic card available from Advanced Micro Devices, Inc. of Santa Clara, California.

Other modules 126 may include other and/or additional sensors, actuators, communications modules/nodes, and/or user interface devices, for example, and may be used to provide additional environmental information related to operation of the mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the survey system 100 (e.g., logic device 112) to provide operational control of the mobile platform 110 and/or the survey system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the mobile platform 110, where each actuated device includes one or more actuators adapted to adjust an orientation of the device, relative to the mobile platform 110, in response to one or more control signals (e.g., provided by the logic device 112). In particular, other modules 126 may include a stereo vision system configured to provide image data that may be used to calculate or estimate a position of the mobile platform 110, for example, or to calculate or estimate a relative position of a navigational hazard in proximity to the mobile platform 110. In various embodiments, the logic device 112 may be configured to use such proximity and/or position information to help safely pilot the mobile platform 110 and/or monitor communication link quality, as described herein.

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communication system 134 of the base station 130) to other devices of the survey system 100, such as the logic device 112. The user interface 132 may also be implemented with logic device 138 (e.g. similar to logic device 112), which may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, and/or other information), for example, or to perform various other processes and/or methods described herein (e.g., via logic device 138).

In one embodiment, the user interface 132 may be adapted to display a time series of various sensor information and/or other parameters as part of or overlaid on a graph or map, which may be referenced to a position and/or orientation of the mobile platform 110 and/or other elements of the survey system 100. For example, the user interface 132 may be adapted to display a time series of positions, headings, and/or orientations of the mobile platform 110 and/or other elements of the survey system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the survey system 100, for example, and to generate control signals to cause the mobile platform 110 to move according to the target heading, route, and/or orientation, or to aim the sensor payload 140 accordingly. In other embodiments, the user interface 132 may be adapted to accept user input modifying a control loop parameter of the logic device 112, for example. In further embodiments, the user interface 132 may be adapted to accept user input including a user-defined target attitude, orientation, and/or position for an actuated or articulated device (e.g., the sensor payload 140) associated with the mobile platform 110, for example, and to generate control signals for adjusting an orientation and/or position of the actuated device according to the target altitude, orientation, and/or position. Such control signals may be transmitted to the logic device 112 (e.g., using the communication system 134 and 120), which may then control the mobile platform 110 accordingly.

The communication system 134 may be implemented as any wired and/or wireless communications module configured to transmit and receive analog and/or digital signals between elements of the survey system 100. For example, the communication system 134 may be configured to transmit flight control signals from the user interface 132 to communication system 120 or 144. In other embodiments, the communication system 134 may be configured to receive sensor data (e.g., visible spectrum and/or infrared still images or video images, or other sensor data) from the sensor payload 140. In some embodiments, the communication system 134 may be configured to support spread spectrum transmissions, for example, and/or multiple simultaneous communications channels between elements of the survey system 100. In various embodiments, the communication system 134 may be configured to monitor the status of a communication link established between the base station 130, the sensor payload 140, and/or the mobile platform 110 (e.g., including packet loss of transmitted and received data between elements of the survey system 100, such as with digital communication links), as described herein. Such status information may be provided to the user interface 132, for example, or transmitted to other elements of the survey system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the survey system 100 (e.g., logic device 112) to provide operational control of the mobile platform 110 and/or survey system 100 or to process sensor data to compensate for environmental conditions, such as an water content in the atmosphere approximately at the same altitude and/or within the same area as the mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the imaging system/sensor payload 140 is implemented as an imaging device, the imaging system/sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the logic device 112) that can be configured to process imagery captured by detector elements of the imaging module 142 before providing the imagery to memory 146 or the communication system 144. More generally, the imaging module 142 may be configured to perform any of the operations or methods described herein, at least in part, or in combination with the logic device 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 144 of the sensor payload 140 may be implemented as any wired and/or wireless communications module configured to transmit and receive analog and/or digital signals between elements of the survey system 100. For example, the communication system 144 may be configured to transmit infrared images from the imaging module 142 to communication system 120 or 134. In other embodiments, the communication system 144 may be configured to receive control signals (e.g., control signals directing capture, focus, selective filtering, and/or other operation of sensor payload 140) from the logic device 112 and/or user interface 132. In some embodiments, communication system 144 may be configured to support spread spectrum transmissions, for example, and/or multiple simultaneous communications channels between elements of the survey system 100. In various embodiments, the communication system 144 may be configured to monitor and communicate the status of an orientation of the sensor payload 140 as described herein. Such status information may be provided or transmitted to other elements of the survey system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the survey system 100, for example, and provide it to various elements of the survey system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the mobile platform 110) and providing such measurements as sensor signals that may be communicated to various devices of the survey system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the survey system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the survey system 100 (e.g., logic device 112) to provide operational control of the mobile platform 110 and/or survey system 100 or to process imagery to compensate for environmental conditions.

In general, each of the elements of the survey system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the survey system 100. In addition, one or more non-transitory mediums may be provided for storing machine readable instructions for loading into and execution by any logic device implemented with one or more of the devices of the survey system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the survey system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the survey system 100 may include one or more modules supporting wired, wireless, and/or a combination of wired and wireless communication techniques. In some embodiments, various elements or portions of elements of the survey system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the survey system 100 may include one or more batteries, capacitors, or other electrical power storage devices, for example, and may include one or more solar cell modules or other electrical power generating devices. In some embodiments, one or more of the devices may be powered by a power source for the mobile platform 110, using one or more power leads. Such power leads may also be used to support one or more communication techniques between elements of the survey system 100.

Figure 2:
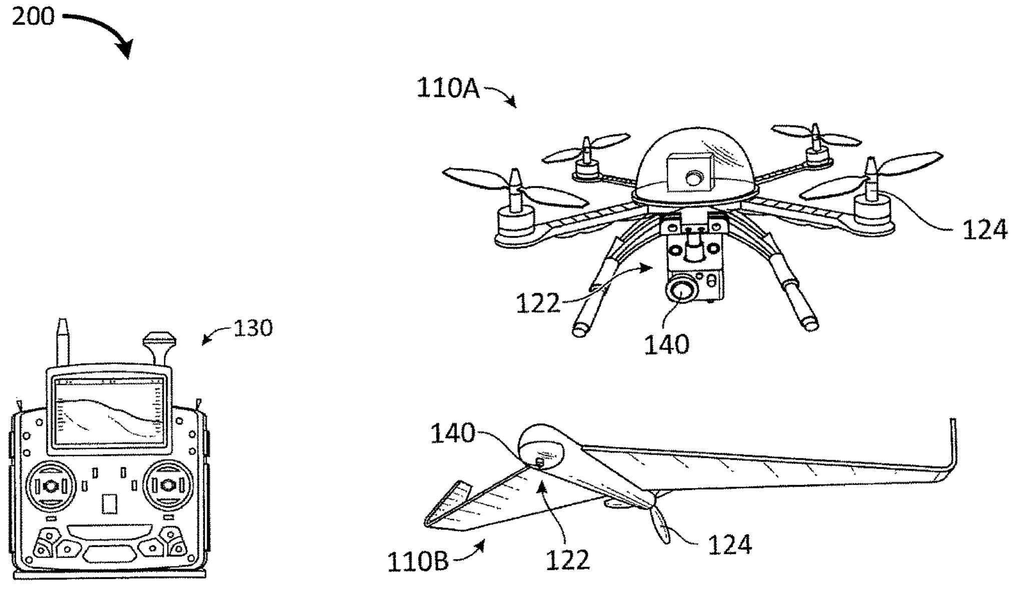
FIG. 2 illustrates a diagram of a survey system in accordance with one or more embodiments of the present disclosure.

FIG. 2 illustrates a diagram of a survey system 200 including mobile platforms 110A and 110B, each with sensor payloads 140 and associated gimbal systems 122 in accordance with one or more embodiments of the present disclosure. In the embodiment shown in FIG. 2, the survey system 200 includes a base station 130, mobile platform 110A with articulated imaging system/sensor payload 140 and gimbal system 122, and mobile platform 110B with articulated imaging system/sensor payload 140 and gimbal system 122, where the base station 130 may be configured to control motion, position, and/or orientation of the mobile platform 110A, mobile platform 110B, and/or sensor payloads 140. More generally, the survey system 200 may include any number of the mobile platforms 110, 110A, and/or 110B.

Figure 3:
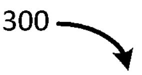
FIG. 3 illustrates a flow diagram of an example process for operating mobile platforms in accordance with one or more embodiments of the present disclosure.
Figure 3:
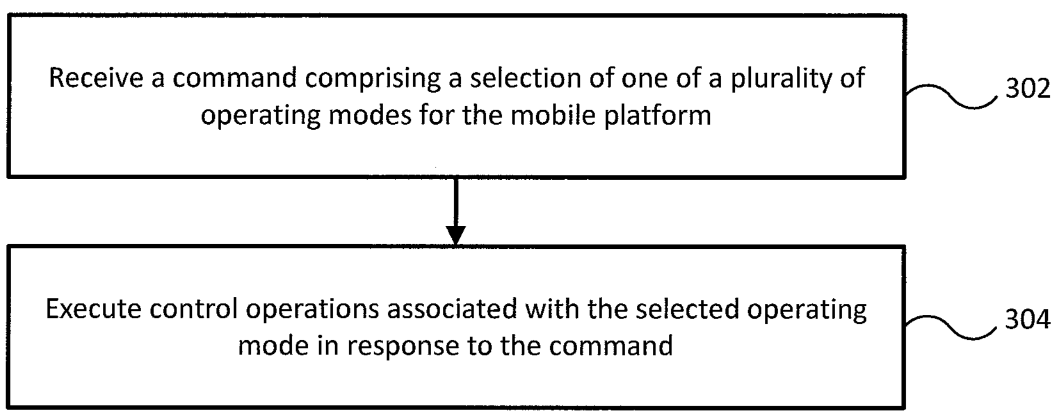

FIG. 3 illustrates a flow diagram of an example process 300 for operating mobile platforms in accordance with one or more embodiments of the present disclosure. Note that one or more operations in FIG. 3 may be combined, omitted, and/or performed in a different order as desired.

At block 302, the logic device 112 of the mobile platform 110 may receive, from the base station 130, a command that includes a selection of one of a plurality of operating modes for the mobile platform 110. In one embodiment, the selected operating mode may be a Look Here—Manual mode. In the Look Here—Manual mode, an operator may identify a geopoint of interest (e.g., a point on Earth described by a latitude, a longitude, and an altitude). The geopoint may be one of a series of pre-determined points of interest, such as part of a navigation route, or may be generated on-the-fly based on what the operator is currently observing through the user interface 132 (e.g., a video stream). In the Look Here—Manual mode, the mobile platform 110 (e.g., by control operations executed by logic device 112) may automatically adjust a heading and payload (e.g., imaging system 140) of the mobile platform 110 to maintain a field of view on a certain geopoint independent of lateral or altitude movements of the mobile platform 110. In some embodiments, in the Look Here—Manual mode, lateral/altitude movements of the mobile platform 110 may be manually controlled by the operator. For example, in some embodiments, bump and rate commands may be used to control the mobile platform 110 (discussed below at block 304). In some embodiments, while in the Look Here—Manual mode, the geopoint of interest may be changed by the operator, such as by manually overriding the automatic adjustments of the heading and/or payload of the mobile platform 110 and marking new geopoints of interest. The Look Here behavior (e.g., automatically adjusting the heading and/or payload to keep a desired geopoint centered in the field of view of a camera of the imaging sytem 140) during the Look Here—Manual mode operation may be paused to allow the operator to select a new geopoint of interest, and when manual override commands cease, the Look Here behavior may resume in relation to the new field of view on the new geopoint of interest set by the operator.

In another embodiment, the selected operating mode may be a Look Here—Navigation mode. The Look Here—Navigation mode may be similar to the Look Here—Manual mode with regard to the Look Here behavior, but may have additional features such as the mobile platform 110 may automatically adjust its lateral and altitude positions according to a pre-determined (e.g., pre-planned) navigation route. For example, the navigation route may be part of an automated/semi-automated mission for the mobile platform 110. The Look Here—Navigation mode may allow the mobile platform 110 to move along the navigation route and provide the operator the flexibility to identify targets or points of interest in real time as the mobile platform 110 may provide, to the base station 130, a video stream of the scenes along the navigation route for the operator.

In a further embodiment, the selected operating mode may be a Look Here—Tracking mode. In the Look Here—Tracking mode, rather than a point of interest being a fixed geopoint, the logic device 112 may detect a target and lock onto it (e.g., using a vision processing algorithm running on the video processing device 128). The logic device 112 may automatically adjust the heading and payload of the mobile platform 110 to keep the detected target in a field of view of the imaging system 140 even as the target moves about an environment. The logic device 112 may automatically adjust the lateral and altitude movement of the mobile platform 110 to keep the detected target at a static relative position from where the Look Here—Tracking mode was initialized, at a predefined default relative position, or at a manually entered relative offset position set by the operator. Thus, while in the Look Here—Tracking mode, the logic device 112 may control the propulsion system 124 so that the mobile platform 110 may follow the target, from a relative offset position, as the target moves and may keep the target in the field of view of the imaging system 140 using the gimbal system 122 and an output from the vision processing algorithm.

In another embodiment, the selected operating mode may be a Fly Here mode. In the Fly Here mode, the logic device 112 may automatically control the lateral movement of the mobile platform 110 to maintain a selectable offset distance away from a specified geopoint. In some cases, the geopoint may be entered/inputted by the operator of the mobile platform 110, while in other cases, the operator may use a video stream provided by the imaging system 140 to select an observed geopoint. In some embodiments, a default distance may be used for the offset distance. For example, a 1:1 ratio of a current height above launch may be used as the default offset distance. As an illustration, when the mobile platform 110 transitions to the Fly Here mode, the mobile platform 110 may be at an altitude of 200 feet (height above launch), thus the mobile platform 110 may maintain a 200-foot lateral distance from the geopoint to obtain the 1:1 ratio. In some embodiments, the logic device 110 may receive adjustments to the ratio between the height above launch and the offset distance to adjust a position of the mobile platform 110 accordingly. As examples, the ratio may be 1:1, 2:1, 5:1, etc. height above launch to offset distance or vice versa In some embodiments, the offset distance may be entered manually by an operator using the base station 130 independent from the height above launch. In some embodiments, when the logic device 112 receives manual adjustments to the altitude of the mobile platform 110 in the Fly Here mode, the logic device 112 may automatically adjust the lateral movement of the mobile platform 110 to match the ratio or, if no ratio is used, meet the otherwise established offset distance.

In another embodiment, the selected operating mode may be a Security mode. For the Security mode, the operator of the mobile platform 110 may identify security waypoints (e.g., using user interface 132) while the mobile platform 110 is in flight so that the mobile platform 110 can return to the security waypoints later when monitoring a security route. In some cases, the mobile platform 110 may fly to each security waypoint in the sequential order by which they are identified, in an order specified by the operator, or in an order that optimizes time and distance efficiency for the mobile platform 110 (e.g., the logic device 112 may perform a shortest path algorithm to determine an efficient security route after each of the security waypoints have been identified).

In the Security mode, each security waypoint on the security route may include a location for the mobile platform 110 (e.g., a latitude, longitude, and altitude), a location of a marked point of interest, a dwell time, and a calculated orientation for the field of view of the imaging system 140 corresponding to the location for the mobile platform 110 that will allow the imaging system 140 to capture images of the point of interest. The logic device 112 may navigate the mobile platform 110 to each waypoint on the security route, position the mobile platform 110 at the appropriate location, and direct the imaging system 140 (e.g., using gimbal system 122) toward the point of interest such that the field of view can capture the point of interest. In some embodiments, the logic device 112 may use an output from the video processing device 128 to confirm that the field of view of the point of interest matches the field of view from when the security waypoint was identified (e.g., by using an output of computer vision plugins of the video processing device 128 and comparing it to stored recognition data for the waypoint to determine if there is a match). In some embodiments, the logic device 112 may navigate the mobile platform 110 to each waypoint in a loop until the Security mode is exited.

The Security mode may be helpful when the useful location of the mobile platform 110 or the field of view for monitoring points of interest cannot be known ahead of time, and thus cannot be pre-planned. As an illustration, if the operator wants to monitor multiple entrances/exits of a building obscured by trees or other obstructions, the operator could fly the mobile platform 110 to a position where there is sufficient visibility of an entrance or exit, mark the location as part of a waypoint of a security route, and continue along to the other entrances/exits to do the same. After marking the waypoints, the operator could send a command to the mobile platform 110 to automatically monitor in the Security mode and the mobile platform 110 may sequentially navigate to each of the waypoints on the security route to provide automated monitoring of the building that is more effective as there will be greater visibility of each point of interest.

In some embodiments, the logic device 112 may dwell at each waypoint on the security route for a configurable period. That is, a dwell time may be set to control how long the mobile platform 110 remains at each waypoint on the security route before moving to a next waypoint. In some embodiments, the logic device 112 may control the propulsion system 124 to have the mobile platform 110 ascend before transitioning to a next waypoint on the security route, which may allow the mobile platform 110 to reach a controllable safe altitude before moving between waypoints to avoid colliding with obstacles.

In yet another embodiment, the selected operating mode may be a Divebomber mode. The Divebomber mode may be used to safely operate the mobile platform 110 in situations where communication loss is expected. Upon entering the Divebomber mode, a geopoint in a current field of view is marked and the logic device 112 may automatically control the imaging system 140 and heading of the mobile platform 110 to keep the field of view centered on the marked geopoint as the mobile platform 110 descends. The logic device 112 may control the propulsion system 124 to have the mobile platform 110 descend to a configurable altitude above the terrain (e.g., the ground beneath the mobile platform 110). During the descent, primary communication loss may be expected (e.g., due to cover/trees interrupting communications between the mobile platform 110 and the base station 130), thus communication fail-safes for the mobile platform 110 may be temporarily disabled and video recording (via the imaging system 140 and the video processing device 128) may be enabled. In some embodiments, when the mobile platform 110 reaches the target altitude above the terrain, the logic device 112 may control the propulsion system 124 to have the mobile platform 110 dwell for a configurable period at the lower altitude. After the dwell period, the logic device 112 may control the propulsion system 124 to have the mobile platform 110 ascend to the altitude from where the mobile platform 110 began its descent or to a different configurable altitude. The logic device 112 may then restore/reenable the communication fail-safes and stop the video recording. The video recording may be stored to a storage of the mobile platform 110 and made available for viewing (e.g., by transmission to the base station 130 or by downloading otherwise, such as during a debriefing after a mission).

At block 304, the logic device 112 may execute control operations associated with the selected operating mode in response to the command received at block 302. In some embodiments, each of the plurality of operating modes may be associated with a plurality of corresponding control operations. In some embodiments, the corresponding control operations may correspond to submodes and the various operating modes may share certain submodes and thus may cause the mobile platform 110 to operate similarly in some aspects.

In some embodiments, the control operations may be primitive commands (e.g., basic commands) that are recognized by and may be processed by logic device 112. For example, block 304 may include logic device 112 converting the command received at block 302 into one or more associated control operations, each of which may be associated with a corresponding primitive command executed by logic device 112. Thus, it will be appreciated that by using commands associated with a plurality of control operations, a user may cause mobile platform 110 to operate in accordance with complex operating modes (e.g., such as the various operating modes discussed herein) without requiring the user to issue multiple primitive commands to mobile platform 110. Advantageously, this approach reduces the user's cognitive load and thus can improve the user's ability to focus on higher level tasks with greater attention and less distraction.

For example, one submode may be a manual submode. In the manual submode, operator inputs (e.g., joystick or other inputs to user interface 132) may control the lateral, heading, and imaging system positions for the mobile platform 110. In an embodiment, lateral movement may be movement in an X/Y plane normal to the ground. Movement in the lateral direction may change the latitude and longitude of the mobile platform 110. The heading of the mobile platform 110 may include a direction that the mobile platform 110 is pointed or rotation of the mobile platform 110 relative to a direction such as the North. The imaging system 140 position may include changes to the tilt angle of the imaging system 140 or other payload sensors relative to the Earth frame (e.g., positive values point "up" and negative values point "down."). To illustrate, a payload tilt angle of −90 degrees may mean looking straight down towards the ground while a +90 degrees tilt angle may mean looking straight up away from the ground.

In some embodiments, in the manual submode, lateral or altitude movement may be controlled by rate or bump commands. A bump may be a single press of an assigned button in the user interface 132 that causes the mobile platform 110 to increase or decrease by a configured amount. For example, one bump command may cause the altitude of the mobile platform 110 to increase or decrease by 10 feet. The logic device 112 may use the propulsion system 124 to have the mobile platform 110 climb smoothly or descend smoothly to the new altitude in response to the bump command. The configured amount for a bump command may be stored in a memory of the mobile platform 110 and adjusted as needed by the operator of the base station 130. For example, the operator may adjust the bump amount so that each bump causes the mobile platform 110 to ascend or descend by 30 feet. In some embodiments, separate bump amounts may be used for different movements. For example, one up bump may be set to cause the mobile platform 110 to ascend by 25 feet while one down bump may be set to cause the mobile platform 110 to descend by 50 feet. Additional bump commands may be set for forward, backward, left, and right directional movements.

A rate command may correspond to a continuous hold of a button (e.g., the same button assigned to the bump command in the user interface 132). When the rate command state is detected by the logic device 112, the logic device 112 may cause the mobile platform 110 to move at a configurable speed in the desired direction until the button is released. In some embodiments, different directions may each have a corresponding speed at which the mobile platform 110 may move in response to a rate command for the direction. For example, descending, ascending, forward, backward, left, and right directional movements may each have their own rate command with an associated configurable speed.

Figure 5:
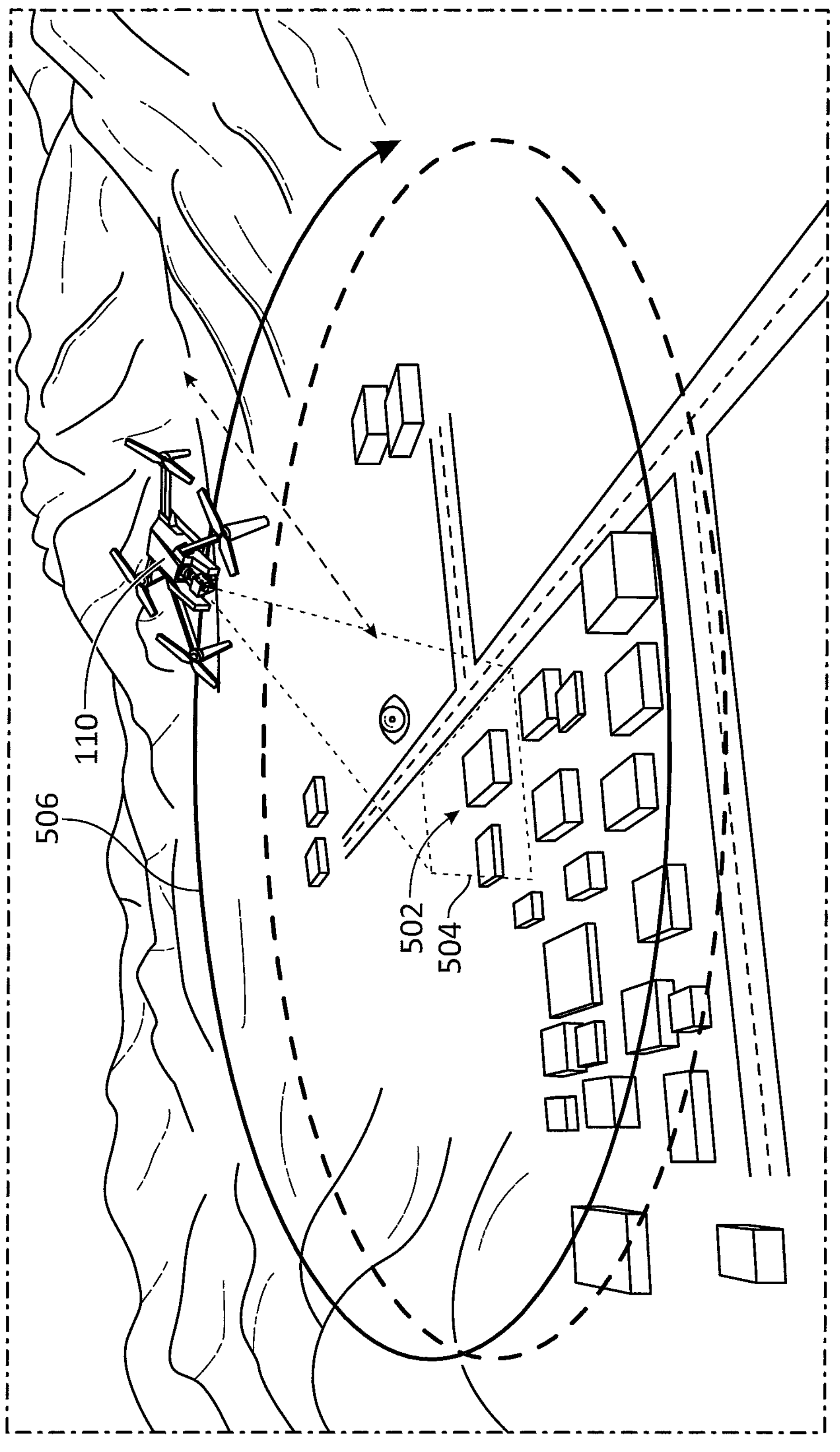
FIG. 5 illustrates a diagram of an operating mode of a mobile platform in accordance with one or more embodiments of the present disclosure.

Now referring to FIG. 5, the logic device 112 may execute control operations associated with the Look Here—Manual mode. The logic device 112 may determine a geopoint 502 to look at based on instructions contained in the command received at block 302. For example, the geopoint 502 may have been previously designated by an operator or the operator may have been viewing a video stream from the mobile platform 110 and may select the geopoint 502 that is currently captured in the field of view 504 and shown in the video stream. The logic device 112 may adjust the heading of the mobile platform 110, using the propulsion system 124, to direct the mobile platform 110 toward the geopoint 502. The logic device 112 may calculate a payload angle for the imaging system 140 to center the field of view 504 on the requested geopoint 502 based on a current geopoint of the mobile platform 110 and the geopoint 502. In some embodiments, the logic circuit 112 may rely on processed image data and/or telemetry information outputted by video processing device 112 to help calculate the payload angle. The calculated payload angle may be used in controlling the gimbal system 122 to orient the imaging system 140 toward the geopoint 502. The aforementioned automated Look Here control operations may be repeated at regular intervals (e.g., 10 Hz) to maintain the field of view 504 centered on the geopoint 502. If manual input, received from the base station 130, affect the imaging system 140 or heading of the mobile platform 110, the Look Here control operations may be paused to not interfere with the operator's inputs. When operator input ceases (e.g., when joysticks on user interface 132 are detected to have returned to neutral), the geopoint 502 of interest may be updated to match the current centered field of view as changed by the operator, and the automatic adjustments of the Look Here control operations may begin again.

In some embodiments, the Look Here control operations executed in the Look Here—Manual operating mode may include receiving lateral operator inputs from the base station 130 and converting the lateral operator inputs to radial commands. For example, as shown in FIG. 5, right and left directional inputs received from the base station 130 may cause the mobile platform 110 to orbit 506 the geopoint 502 instead of the normal movement in the X or Y-direction in a lateral plane. In some embodiments, altitude commands received from the base station 130 in the Look Here—Manual operating mode may be unchanged from the manual submode.

Figure 6:
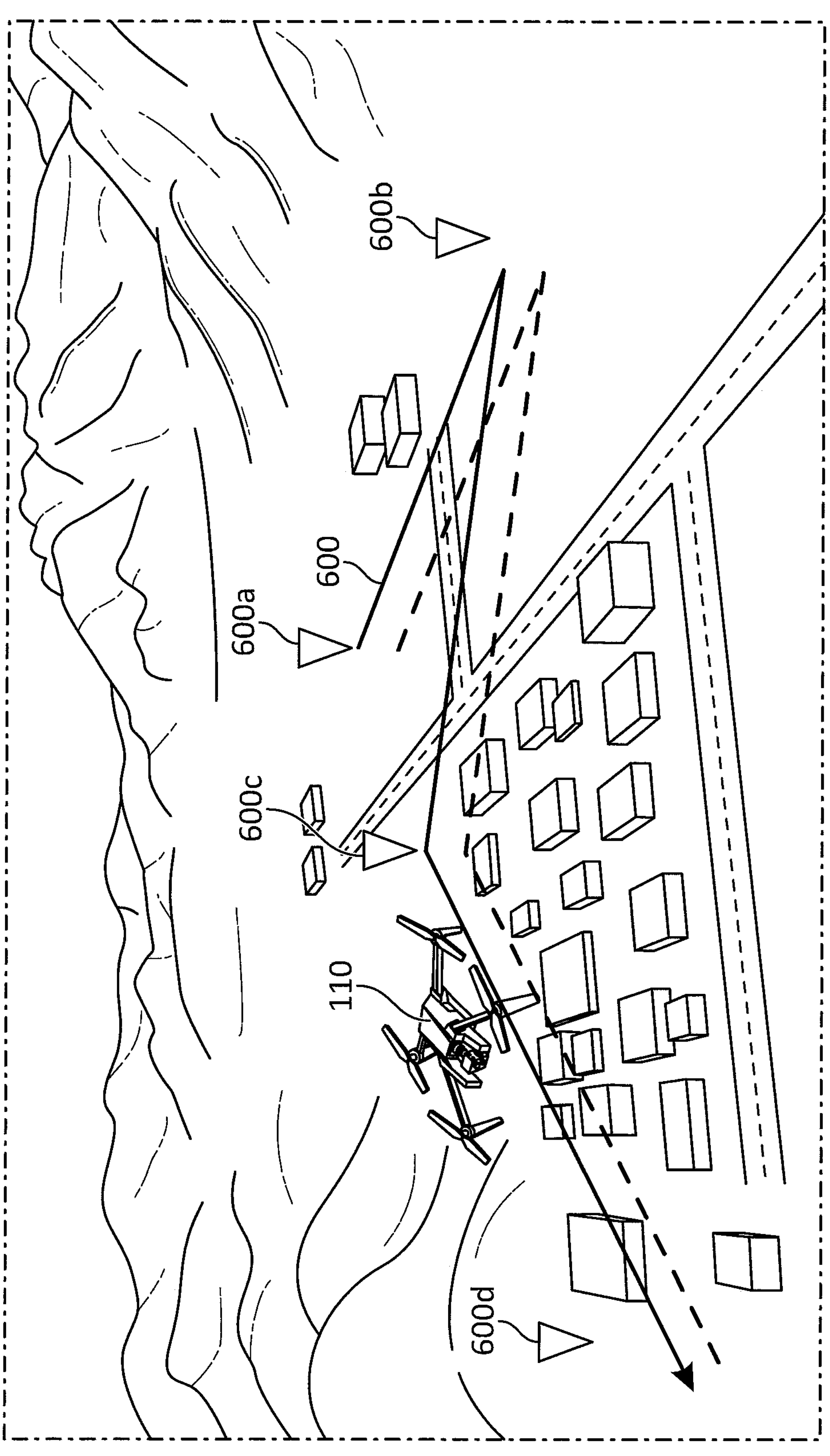
FIG. 6 illustrates a diagram of an operating mode of a mobile platform in accordance with one or more embodiments of the present disclosure.

In some embodiments, the logic device 112 may execute control operations associated with the Look Here—Navigation mode. Control operations for the imaging system 140 of the mobile platform 110 in the Look Here—Navigation mode may be similar to those of the Look Here—Manual mode. However, referring to FIG. 6, the logic device 112 may automatically control the lateral and altitude movements of mobile platform 110, using the propulsion system 124, to travel along a navigation route 600. For example, the navigation route 600 may be part of a pre-programmed mission assigned to the mobile platform 110 where the navigation route 600 includes waypoints 600*a*-600*d*. While in the Look Here—Navigation mode, the logic device 112 may use the gimbal system 122 to orient the imaging system 140 toward the geopont of the current target waypoint (e.g., waypoints 600*a*-600*d* in navigation route 600), which may enable the operator to quickly view what the mobile platform 110 is flying towards. In the Look Here—Navigation mode, the operator may have the flexibility to identify targets in real time as automated operation of the imaging system 140 can be overridden by manual operation by the operator and placed on pause. When manual control of the imaging system 140 ceases, the automated control of the imaging system 140 may resume to have the imaging system 140 look at the next waypoint on the navigation route 600.

Figure 7:
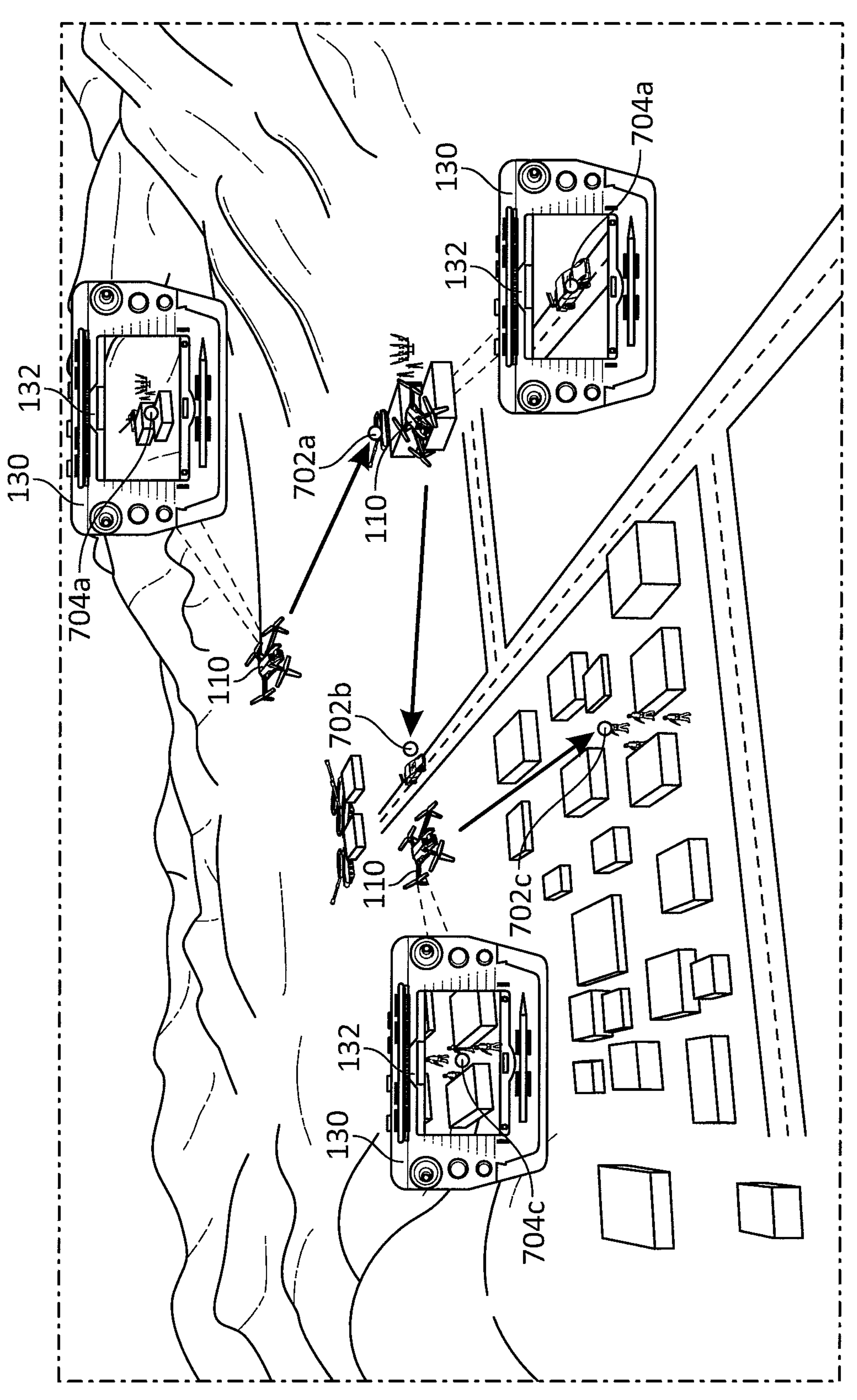
FIG. 7 illustrates a diagram of an operating mode of a mobile platform in accordance with one or more embodiments of the present disclosure.

In one embodiment, the logic device 112 may execute control operations associated with the Look Here—Tracking mode. In this embodiment, the logic device 112 may execute one or more vision processing algorithms using a vision processor (e.g., video processing device(s) 128) to determine headings and payload tilt angles to track targets 702*a*-702*c* as shown in FIG. 7. An output from the vision processor may be used to direct the imaging system 140, using gimbal system 122, toward the target. The logic device 112 may initialize the Look Here—Tracking mode using the current distance and azimuth to the centered field of view point and may adjust the lateral and altitude positions of the mobile platform 110 to keep those values close to the initialized values. Thus, if the target moves, the vision processor will cause the imaging system 140 to rotate/tilt, and the logic device 112 will adjust the lateral and altitude positions to keep the same distance and azimuth for the centered field of view. Thus, the mobile platform 110 may follow the target at the same relative position. If operator input is detected for the lateral or altitude positions of the mobile platform 110, the automatic adjustments to track the target may be paused to allow the operator to reposition the mobile platform 110. When the operator input ceases, the distance and azimuth may be re-initialized at the new relative position to the target, and the automatic adjustments may be resumed based on target movement and the new relative position. As shown in FIG. 7, the mobile platform 110 may capture images of the targets 702*a*-702*c* such as in a video stream and communicate the images to the base station 130 where the operator of the mobile platform 110 may view images 704*a*-704*c* of the tracked targets 702*a*-702*c* in the user interface 132 of the base station 130.

In some embodiments, the logic device 112 may execute control operations associated with the Fly Here mode. In the Fly Here mode, the logic device may automatically adjust the imaging system 140, using gimbal system 122, to keep a desired geopoint in the field of view of the camera (e.g., centered in the field of view). The logic device 112 may navigate the mobile platform 110, using the propulsion system 124, to an offset position relative to the geopoint. For example, the offset position may be a distance that is preconfigured or selected by the operator. The offset distance may be calculated as a ratio of the mobile platform's 110 height above ground. For example, where a 1:1 ratio is used, the logic device 112 may maneuver the mobile platform 110 to be at a 45-degree angle relative to the marked geopoint. In some embodiments, when en-route to the offset distance, manual operator inputs to move the mobile platform 110 forward or backward may be rejected, but requests to move left or right may be accepted as if in the Look Here—Manual mode (e.g., the logic device 112 may cause the mobile platform 110 to orbit the geopoint while centering the field of view on the geopoint in response to the left or right directional commands while continuing to move toward the geopoint). Once the mobile platform 110 is at the offset distance, requests to move left or right received by the logic device 112 from the base station 130 may be converted to instructions to begin automatic orbiting of the marked geopoint. In some embodiments, the logic device 112 may orbit the marked geopoint at a configurable speed. As with the Look Here modes, the operator may adjust the marked geopoint at any time when in the Fly Here mode using payload or heading manual inputs, and the control operations associated with the Fly Here mode may be executed to move the mobile platform 110 to the newly marked geopoint.

Figure 8:
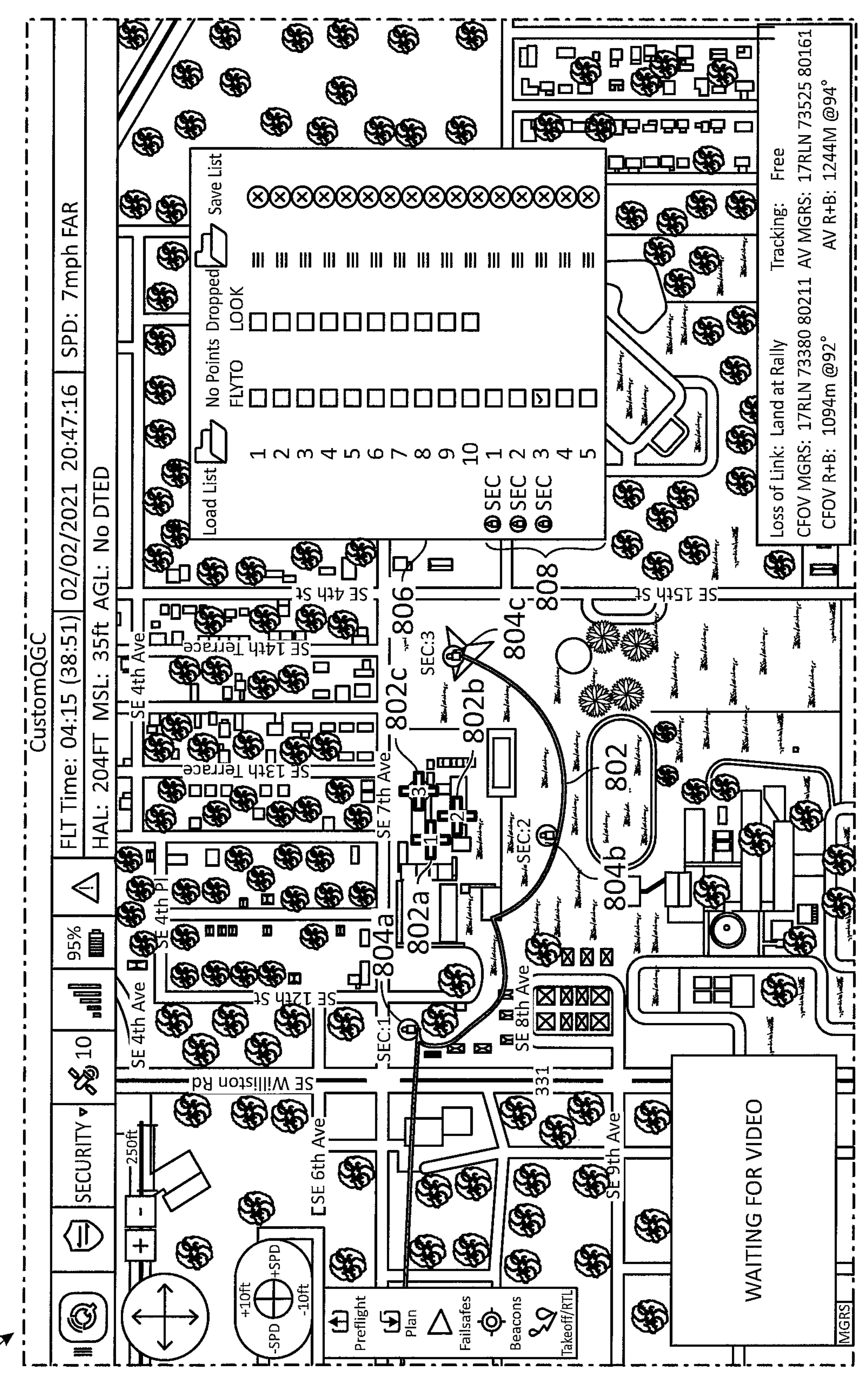
FIG. 8 illustrates a user interface of a base station used in conducting an operating mode of a mobile platform in accordance with one or more embodiments of the present disclosure.

Referring to FIG. 8, in some embodiments, the logic device 112 may execute control operations associated with the Security mode. In the Security mode, the logic device 112 may access a database that stores a plurality of security waypoints 808 for a security route that the mobile platform 110 may monitor. The logic device 112 may determine a plurality of locations 804*a*-804*c* for the mobile platform 110 on the security route 802 and a plurality of points of interest 802*a*-802*c* for the security route 802. For example, each waypoint may include a location for the mobile platform 110 (latitude, longitude, and altitude) and a location for the corresponding point of interest that the mobile platform 110 may monitor. Each waypoint may further include a dwell time indicating how long the mobile platform 110 will dwell at a location on the security route 802 and monitor the corresponding point of interest.

As the logic device 112 navigates the mobile platform 110 between each location on the security route 802, the logic device 112 may determine a field of view to capture the next point of interest similar to the Look Here control operations described above. For example, the logic device 112 may adjust the heading of the mobile platform 110 and/or the orientation of the imaging system 140 based on the current geopoint of the mobile platform 110 and the geopoint of the point of interest.

As shown in FIG. 8, as the mobile platform 110 approaches the location 804*a* from which the mobile platform 110 will monitor point of interest 802*a* on security route 802, the logic device 112 may determine a field of view for the imaging system 140 to capture the point of interest 802*a*, such as for video streaming to provide an operator with a visual of the point of interest 802*a*. The logic device 112 may adjust the heading and/or orientation of the imaging system 140 as the mobile platform 110 approaches the location 804*a* and the point of interest 802*a* so that the point of interest 802*a* is kept centered in the field of view for the imaging system 140. For example, the logic device 112 may determine the heading and/or tilt angle of the imaging system 140 based on the current geopoint of the mobile platform 110 as it approaches location 804*a* and the geopoint of the point of interest 802*a*. Once the mobile platform 110 has arrived at the location 804*a*, the logic device 112 may control the mobile platform 110 to have the mobile platform 110 dwell at the location 804*a* for the dwell period associated with the security waypoint that includes the location 804*a* and the point of interest 802*a*. Once the dwell period has expired, the logic device 112 may navigate the mobile platform 110 to the next location 804*b* to monitor point of interest 802*b* and the aforementioned arrival and dwell process may be repeated. In some cases, the points of interests 802*a*-802*c* may be entrances/exits of buildings and the mobile platform 110 may continuously increment between each location 804*a*-804*c* to monitor each of the entrances/exits.

In some embodiments, before lateral movement occurs to move between locations 804*a*-804*c* on security route 802, the logic device 112 may verify that the mobile platform 110 is above a safe threshold altitude (e.g., by using a rangefinder to sense a height above ground or using video processing device 128 to determine a telemetry for the mobile platform 110 and/or whether the mobile platform 110 has sufficient clearance from nearby obstacles). If the mobile platform 110 is not above the safe threshold altitude, the logic device 112 may cause the mobile platform 110 to ascend to the safe threshold altitude before navigating to a next location. By ascending to the safe threshold altitude, the mobile platform 110 may be less likely to collide with obstacles or encounter threats.

In some embodiments, the operator may interact with the user interface 132 to add, remove, rearrange, and edit the security waypoints 808 for the security route 802. For example, the operator may edit a dwell time for each of the security waypoints 808 or the desired field of view for each of the security waypoints 808. Any changes may be sent from the base station 130 to the mobile platform 110 so that the logic device 112 can update the security route 802 accordingly.

Figure 9:
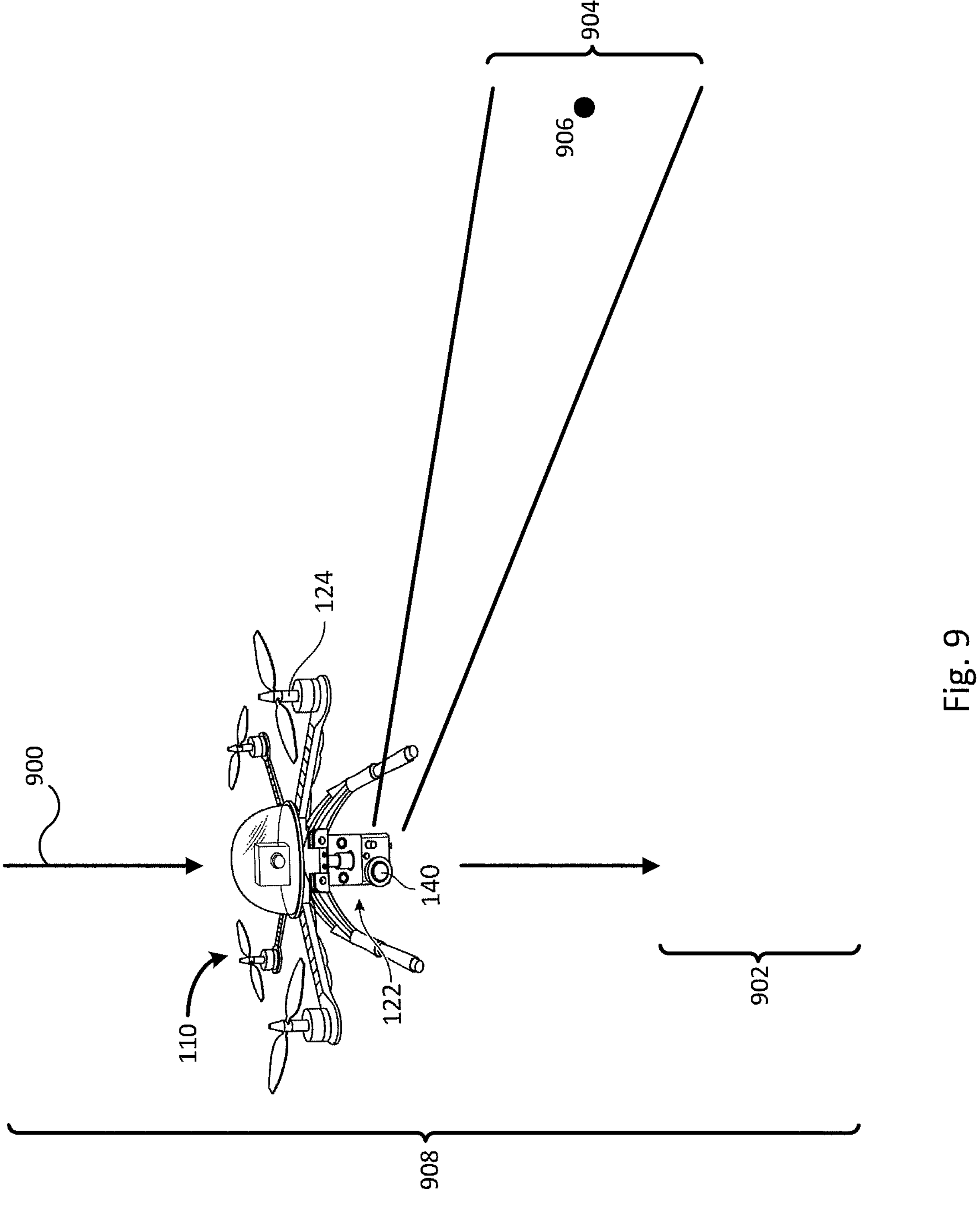
FIG. 9 illustrates a diagram of an operating mode of a mobile platform in accordance with one or more embodiments of the present disclosure.

Referring to FIG. 9, in some embodiments, the logic device 112 may execute control operations associated with the Divebomber mode. In the Divebomber mode, the logic device 112 may disable a communication fail-safe for the mobile platform. For example, the communication fail-safe may be operations that the mobile platform 110 would perform in an event where communications are lost with the base station 130, such as flying to a home location or last location where communications were transmittable between the mobile platform 110 and the base station 130. The logic device 112 may start recording the field of view of a marked geopoint corresponding to the point of interest 906 using the imaging system 140. The logic device 112 may then cause the mobile platform 110 to descend at a configurable rate, using the propulsions system 124, to a configurable altitude position 902. During the descent 900, the logic device 112 may adjust the imaging system 140, using the gimbal system 122, to maintain the field of view 904 on the point of interest 906. The logic device 112 may poll a sensor attached to the mobile platform 110 (e.g., a laser rangefinder) for readings indicating the mobile platform's 110 height above the ground to determine when the mobile platform 110 has reached the desired altitude position 902. In some embodiments, the logic device 112 may also use telemetry information provided by the video processing device 128 to determine the mobile platform's height above the ground. In some cases, the logic device may compare readings from a laser rangefinder and telemetry information from the video processing device 128 to determine an accurate height above the ground. The logic device 112 may halt the descent 900 at the desired altitude position 902. If at any point during the descent, the sensor stops providing readings to the logic device 112, the sensor reports an error, or an output from the video processing device 128 indicates a collision with an object/obstacle may occur, the logic device 112 may exit the Divebomber mode since it may not be able to safely execute the control operations for the Divebomber mode.

The logic device 112 may dwell at the altitude position 902 for a configurable amount of time. In some embodiments, after the dwell period, the logic device 112 may reset the target altitude position 908 to a configurable altitude or the altitude value when the Divebomber mode was entered. The logic device 112 may then cause the mobile platform 110 to ascend to the target altitude position 908 at a configurable rate. Once the mobile platform 110 has reached its target altitude position 908, the logic device 112 may transition the mobile platform 110 to whichever mode the mobile platform 110 was in prior to the Divebomber mode or another default operating mode.

When exiting the Divebomber mode, the logic device 112 may stop recording video of the point of interest 906 and reenable the temporarily disabled communication fail-safes.

Figure 4:
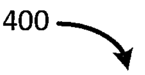
FIG. 4 illustrates a flow diagram of an example process for video processing using a low-latency video pipeline of a video processing device in accordance with one or more embodiments of the present disclosure.
Figure 4:
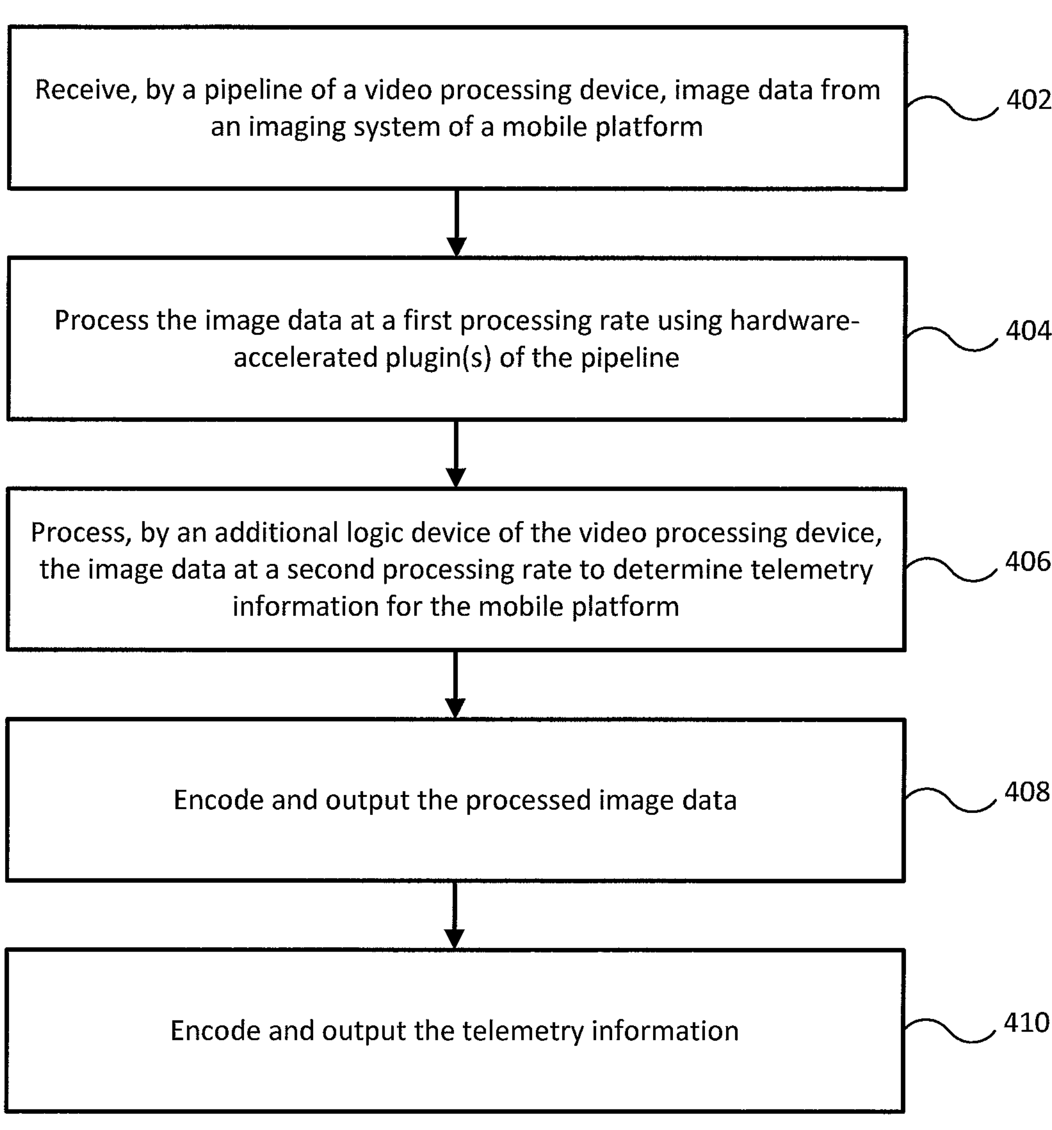
Figure 10:
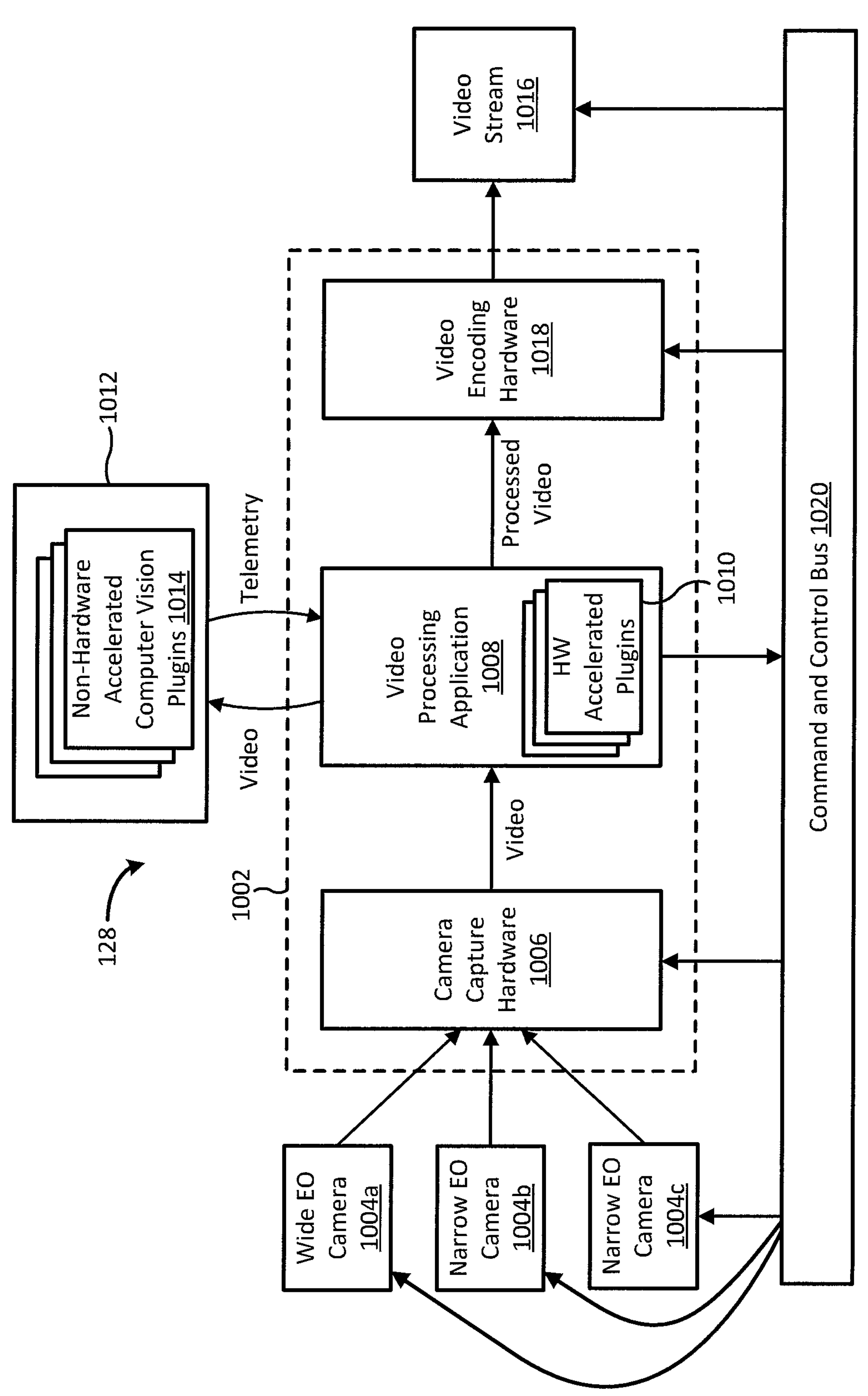
FIG. 10 illustrates a diagram of a video processing device, including a low-latency video pipeline, in accordance with one or more embodiments of the present disclosure.

FIG. 10 illustrates the video processing device 128 of the mobile platform 110 in accordance with one or more embodiments of the disclosure. The video processing device 128 may have a low-latency video pipeline 1002. FIG. 4 illustrates a flow diagram of an example process 400 for video processing using the low-latency video pipeline 1002 in accordance with one or more embodiments of the present disclosure. Note that one or more operations in FIG. 4 may be combined, omitted, and/or performed in a different order as desired.

At block 402, the pipeline 1002 may receive/capture image data from the imaging system 140 of the mobile platform 110 using camera capture hardware 1006. For example, in the embodiment shown in FIG. 10, the pipeline 1002 may select one or more of the cameras 1004*a*-1004*c* from which to receive image data using camera capture hardware 1006. Wide electro-optical camera 1004*a*, narrow electro-optical camera 1004*b*, and wide infrared camera 1004*c* may each be integrated into the imaging system 140 as imaging modules (e.g., as part of an EO/IR system) in some embodiments. According to various embodiments, the pipeline 1002 may select the one or more cameras based on one or more commands received from the base station 130, such as commands related to an operating mode in which the imaging system 140 is used to capture images of a field of view.

At block 404, the pipeline 1002 may process the image data received from the one or more selected cameras using a hardware-accelerated video processing application 1008 and hardware-accelerated plugins 1010 in the pipeline 1002 on the video processing device 128. For example, the hardware-accelerated application 1008 may process the camera sensor data captured by the camera capture hardware 1006 into computer-readable code and various filters may be applied through the hardware-accelerated plugins 1010 to affect the processed image data. In some embodiments, the hardware-accelerated video processing application 1008 and/or hardware-accelerated plugins 1010 may perform camera selection (EO/IR), zoom, image stabilization, and handling of user commands. Command and control bus 1020 may be a high-speed internal message bus for communicating with the cameras and all the plugins of the video processing device 128.

At block 406, an additional logic device 1012 of the video processing device 128, which may be in communication with the pipeline 1002, may receive image data from the pipeline 1002. The additional logic device 1012 may process the image data at a second processing rate to determine telemetry information for the mobile platform. In some embodiments, the second processing rate may be slower than the first processing rate and may include using non-hardware-accelerated computer vision plugins 1014 that are isolated from the pipeline 1002 so their higher latency does not propagate to the video stream 1016. The additional logic device 1012 may provide the telemetry information to the pipeline 1002 for output with the processed image data.

At block 408, the pipeline 1002 may encode and output the processed image data from the video processing application 1008 using video encoding hardware 1018 of the video processing device 128. The processed image data may be included in the video stream 1016, which may be transmitted to the base station 130 or stored locally on the mobile platform 110.

At block 410, the pipeline 1002 may encode and output the telemetry information along with the video stream 1016. The telemetry information may be used to provide an overlay in user interface 132 for telemetry information corresponding to the current position of the mobile platform 110. In some embodiments, the logic device 112 may obtain and use the processed image data and/or telemetry information outputted from the video processing device 128 to execute at least one of the plurality of control operations for an operating mode of the mobile platform. For example, the telemetry information may provide a geopoint, heading, and other information related to the condition of the mobile platform 110 in real time, which may assist in navigating the mobile platform 110, adjusting the heading of the mobile platform 110, and orienting the imaging system 140 as needed to direct a field of view toward a point of interest in the various operating modes of the disclosure.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A mobile platform comprising:

a propulsion system configured to provide motive force for the mobile platform in navigation about an environment;

an imaging system configured to capture images of a field of view of the environment;

a logic device in communication with the propulsion system and the imaging system, the logic device configured to:

receive, from a base station, a command comprising a selection of one of a plurality of operating modes for the mobile platform, wherein each operating mode is associated with a plurality of corresponding control operations, and execute the control operations associated with the selected operating mode in response to the command; and a video processing device comprising:

a pipeline configured to receive image data from the imaging system and process the image data at a first processing rate using a hardware-accelerated application and one or more hardware-accelerated plugins, and an additional logic device in communication with the pipeline, wherein the additional logic device is configured to:

receive the image data from the pipeline, process the image data at a second processing rate to determine telemetry information for the mobile platform, the telemetry information providing a geopoint and/or heading of the mobile platform, wherein the second processing rate is slower than the first processing rate, and provide the telemetry information to the pipeline for output with the processed image data, wherein the slower processing rate of the additional logic device does not propagate to the pipeline.

2. The mobile platform of claim 1, wherein the control operations associated with the selected operating mode comprise:

navigating the mobile platform, using the propulsion system, to a predetermined offset position relative to a first geopoint, wherein the first geopoint is one of a plurality of geopoints for a navigation route;

adjusting a heading of the mobile platform, using the propulsion system, to direct the mobile platform toward the first geopoint; and controlling a gimbal system of the mobile platform to orient the imaging system toward the first geopoint;

navigating the mobile platform, using the propulsion system, to a predetermined offset position relative to a second geopoint for the navigation route;

adjusting the heading of the mobile platform, using the propulsion system, to direct the mobile platform toward the second geopoint; and controlling the gimbal system to orient the imaging system toward the second geopoint;

wherein the pipeline comprises:

a camera capture hardware configured to receive the image data from a selected one or more of a plurality of cameras, wherein the hardware-accelerated processing application and/or the one or more hardware-accelerated plugins are configured to process the image data, wherein the processing comprises at least one of: applying a filter; performing camera selection, setting a zoom, performing image stabilization, and/or processing user commands; and a video encoding hardware configured to encode and output processed image data from the hardware-accelerated processing application and/or the one or more hardware-accelerated plugins;

wherein the additional logic device is configured to receive the image data from the hardware-accelerated processing application and/or the one or more hardware-accelerated plugins, and to provide the telemetry information to the hardware-accelerated processing application and/or the one or more hardware-accelerated plugins.

3. The mobile platform of claim 1, wherein the control operations associated with the selected operating mode comprise:

detecting a target in the field of view;

adjusting a heading of the mobile platform, using the propulsion system, to direct the mobile platform toward the target;

controlling a gimbal system of the mobile platform to orient the imaging system toward the target; and navigating the mobile platform, using the propulsion system, to maintain an offset position relative to the target;

wherein the mobile platform is configured to use the geopoint and/or heading in real time to assist in navigating the mobile platform and/or adjusting the heading of the mobile platform and/or orienting the imaging system to direct a field of view toward a point of interest; and wherein the processing the image data at the first processing rate by the pipeline comprises one or more of: applying a filter; selecting a camera of the imaging system; setting a zoom; performing image stabilization; and/or processing user commands.

4. The mobile platform of claim 1, wherein the control operations associated with the selected operating mode comprise:

navigating the mobile platform, using the propulsion system, to an offset position relative to a geopoint;

in response to a rate command received from the base station, causing the mobile platform to orbit the geopoint at a predetermined speed using the propulsion system; and in response to a bump command received from the base station, causing the mobile platform to move by a predetermined amount in an orbit of the geopoint;

wherein the mobile platform is configured to use the geopoint and/or heading in real time to assist in navigating the mobile platform and/or adjusting the heading of the mobile platform and/or orienting the imaging system to direct a field of view toward a point of interest.

5. A mobile platform comprising:

a propulsion system configured to provide motive force for the mobile platform in navigation about an environment;

an imaging system configured to capture images of a field of view of the environment; and a logic device in communication with the propulsion system and the imaging system, the logic device configured to:

receive, from a base station, a command comprising a selection of one of a plurality of operating modes for the mobile platform, wherein each operating mode is associated with a plurality of corresponding control operations, and execute the control operations associated with the selected operating mode in response to the command;

wherein the control operations associated with the selected operating mode comprise:

disabling a communication fail-safe for the mobile platform;

starting to record the field of view using the imaging system, wherein the field of view captures a point of interest;

descending, using the propulsion system, to a first altitude and adjusting the imaging system, using a gimbal system of the mobile platform, during the descent to maintain the field of view on the point of interest;

ascending, using the propulsion system, to a second altitude;

stopping the recording; and reenabling the communication fail-safe.

6. The mobile platform of claim 1, wherein the control operations associated with the selected operating mode comprise:

determining a plurality of locations for the mobile platform on a security route;

determining a plurality of points of interest on the security route, wherein each of the locations is associated with a corresponding one of the points of interest;

determining a field of view for each of the locations to monitor its corresponding point of interest;

navigating the mobile platform, using the propulsion system, to each of the locations; and controlling a gimbal system of the mobile platform at each of the locations to orient the imaging system toward the corresponding points of interest;

wherein the logic device is configured to use the geopoint and/or heading in real time to assist in orienting the imaging system to direct a field of view toward a point of interest.

7. The mobile platform of claim 5, further comprising a video processing device comprising a pipeline configured to:

receive image data from the imaging system; and process the image data at a first processing rate using a hardware-accelerated application and one or more hardware-accelerated plugins.

8. The mobile platform of claim 7, wherein:

the imaging system comprises a plurality of cameras;

the image data is received from a selected one of the cameras; and the pipeline is further configured to encode and output the processed image data.

9. The mobile platform of claim 7, wherein the video processing device further comprises an additional logic device in communication with the pipeline, wherein the additional logic device is configured to:

receive the image data from the pipeline;

process the image data at a second processing rate to determine telemetry information for the mobile platform, wherein the second processing rate is slower than the first processing rate; and provide the telemetry information to the pipeline for output with the processed image data.

10. The mobile platform of claim 9, wherein the logic device is further configured to:

receive the telemetry information; and execute at least one of the plurality of control operations using the telemetry information.

11. A method comprising:

receiving, by a logic device of a mobile platform, from a base station, a command comprising a selection of one of a plurality of operating modes for the mobile platform, wherein each operating mode is associated with a plurality of corresponding control operations;

executing, by the logic device, the control operations associated with the selected operating mode in response to the command, wherein the logic device is in communication with:

a propulsion system of the mobile platform configured to provide motive force for the mobile platform in navigation about an environment, and an imaging system of the mobile platform configured to capture images of a field of view of the environment;

receiving, by a pipeline of a video processing device of the mobile platform, image data from the imaging system;

processing the image data at a first processing rate, by the pipeline, using a hardware-accelerated application and one or more hardware-accelerated plugins; and wherein the video processing device further comprises an additional logic device in communication with the pipeline, and wherein the method further comprises:

receiving, by the additional logic device, the image data from the pipeline, processing, by the additional logic device, the image data at a second processing rate to determine telemetry information for the mobile platform, the telemetry information providing a geopoint and/or heading of the mobile platform, wherein the second processing rate is slower than the first processing rate, and providing, by the additional logic device, the telemetry information to the pipeline for output with the processed image data, wherein the slower processing rate of the additional logic device does not propagate to the pipeline.

12. The method of claim 11, wherein the control operations associated with the selected operating mode comprise:

navigating the mobile platform, using the propulsion system, to a predetermined offset position relative to a first geopoint, wherein the first geopoint is one of a plurality of geopoints for a navigation route;

adjusting a heading of the mobile platform, using the propulsion system, to direct the mobile platform toward the first geopoint; and controlling a gimbal system of the mobile platform to orient the imaging system toward the first geopoint;

navigating the mobile platform, using the propulsion system, to a predetermined offset position relative to a second geopoint for the navigation route;

adjusting the heading of the mobile platform, using the propulsion system, to direct the mobile platform toward the second geopoint; and controlling the gimbal system to orient the imaging system toward the second geopoint;

wherein the pipeline comprises:

a camera capture hardware configured receiving the image data from a selected one or more of a plurality of cameras, wherein the hardware-accelerated processing application and/or the one or more hardware-accelerated plugins process the image data, wherein the processing comprises at least one of: applying a filter; performing camera selection, setting a zoom, performing image stabilization, and/or processing user commands; and a video encoding hardware encoding and outputting processed image data from the hardware-accelerated processing application and/or the one or more hardware-accelerated plugins;

wherein the additional logic device receives the image data from the hardware-accelerated processing application and/or the one or more hardware-accelerated plugins, and provides the telemetry information to the hardware-accelerated processing application and/or the one or more hardware-accelerated plugins.

13. The method of claim 11, wherein the control operations associated with the selected operating mode comprise:

detecting a target in the field of view;

adjusting a heading of the mobile platform, using the propulsion system, to direct the mobile platform toward the target;

controlling a gimbal system of the mobile platform to orient the imaging system toward the target; and navigating the mobile platform, using the propulsion system, to maintain an offset position relative to the target;

wherein the mobile platform uses the geopoint and/or heading in real time to assist in navigating the mobile platform and/or adjusting the heading of the mobile platform and/or orienting the imaging system to direct a field of view toward a point of interest; and wherein the processing the image data at the first processing rate by the pipeline comprises one or more of: applying a filter; selecting a camera of the imaging system;

setting a zoom; performing image stabilization; and/or processing user commands.

14. The method of claim 11, wherein the control operations associated with the selected operating mode comprise:

navigating the mobile platform, using the propulsion system, to an offset position relative to a geopoint;

receiving a rate command and a bump command;

in response to the rate command received from the base station, causing the mobile platform to orbit the geopoint at a predetermined speed using the propulsion system; and in response to the bump command received from the base station, causing the mobile platform to move by a predetermined amount in an orbit of the geopoint;

wherein the mobile platform uses the geopoint and/or heading in real time to assist in navigating the mobile platform and/or adjusting the heading of the mobile platform and/or orienting the imaging system to direct a field of view toward a point of interest.

15. The method of claim 11, wherein the control operations associated with the selected operating mode comprise:

disabling a communication fail-safe for the mobile platform;

starting to record the field of view using the imaging system, wherein the field of view captures a point of interest;

descending, using the propulsion system, to a predetermined first altitude and adjusting the imaging system, using a gimbal system of the mobile platform, during the descent to maintain the field of view on the point of interest;

ascending, using the propulsion system, to a second altitude;

stopping the recording; and reenabling the communication fail-safe.

16. The method of claim 11, wherein the control operations associated with the selected operating mode comprise:

determining a plurality of locations for the mobile platform on a security route;

determining a plurality of points of interest on the security route, wherein each of the locations is associated with a corresponding one of the points of interest;

determining a field of view for each of the locations to monitor its corresponding point of interest;

navigating the mobile platform, using the propulsion system, to each of the locations; and controlling a gimbal system of the mobile platform at each of the locations to orient the imaging system toward the corresponding points of interest;

wherein the logic device uses the geopoint and/or heading in real time to assist in orienting the imaging system to direct a field of view toward a point of interest.

17. The method of claim 11, wherein:

the imaging system comprises a plurality of cameras;

the image data is received from a selected one of the cameras; and the method further comprises encoding and outputting the processed image data by the pipeline.

18. The method of claim 11, further comprising:

receiving, by the logic device, the telemetry information; and executing, by the logic device, at least one of the plurality of control operations using the telemetry information.

19. The mobile platform of claim 1, wherein the control operations associated with at least one of the operating modes comprise:

maintaining a lateral distance relative to a prespecified geopoint, the lateral distance being specified as a ratio involving a height of the mobile platform at a time when the mobile platform transitions to the at least one of the operating modes.

20. The method of claim 11, comprising the mobile structure transitioning to at least one operating mode which is one of the operating modes and whose associated control operations comprise:

maintaining a lateral distance relative to a prespecified geopoint, the lateral distance being specified as a ratio involving a height of the mobile platform at a time when the mobile platform transitions to the at least one operating mode.

* * * * *